United States Patent [19]

Bernard, II et al.

[11] 4,389,157
[45] Jun. 21, 1983

[54] RETRIEVAL AND STORAGE MECHANISM FOR USE WITH AN AUTOMATED ROTATING STORAGE UNIT

[75] Inventors: Clay Bernard, II, Point Richmond, Calif.; William F. Matheny, III, Tulsa, Okla.; Charles M. Faith, Broken Arrow, Okla.; Richard L. Goswick, Tulsa, Okla.; Jerry L. Hauth, Broken Arrow, Okla.

[73] Assignee: SPS Technologies, Inc., Jenkintown, Pa.

[21] Appl. No.: 281,841

[22] Filed: Jul. 9, 1981

[51] Int. Cl.³ .............................................. B65G 1/06
[52] U.S. Cl. .................................... 414/787; 414/278; 414/280
[58] Field of Search ............... 414/277, 278, 280, 286, 414/661, 662, 663, 664, 668, 687, 331

[56] References Cited

U.S. PATENT DOCUMENTS

3,554,391 1/1971 Goodell .............................. 414/331
4,007,846 2/1977 Pipes ................................ 414/280 X

Primary Examiner—Robert G. Sheridan
Attorney, Agent, or Firm—William S. Dorman; Aaron Nerenberg

[57] ABSTRACT

In combination with automatic storage and retrieval system having a continuous track which supports a continuous rotating storage unit to move therearound in a horizontal direction, the rotating storage unit including a plurality of horizontally spaced shelves arranged vertically into columns, a conveyor system mounted adjacent the rotating storage unit for moving storage bins towards and away from the rotating storage unit, and an elevator mounted in a fixed position between the rotating storage unit and the conveyor system; a platform mounted in the elevator for vertical movement up and down adjacent the rotating storage unit, an extraction and insertion arm assembly slidably mounted on the platform, the arm assembly including a pair of longitudinally disposed extractor arms having the forward ends extending towards the rotating storage units, a motor for driving the arm assembly in a horizontal direction towards and away from the rotating storage unit for bin placement in and withdrawal from a preselected shelf; spring loaded flippers mounted on the forward end of each arm for removing a bin from a preselected shelf during the extraction operation; a pusher block mounted on the upper portion of each the arm for pushing a bin onto a preselected shelf during the insertion operation; a conveyor belt assembly mounted on the platform in longitudinal alignment therewith between the extractor arms for aiding the movement of a bin into or withdrawal from a preselected shelf; and retaining bars for securing a bin on the platform.

11 Claims, 17 Drawing Figures

RETRIEVAL AND STORAGE MECHANISM FOR USE WITH AN AUTOMATED ROTATING STORAGE UNIT

CROSS-REFERENCE TO RELATED APPLICATION

The present invention discloses, inter alia, a storage carousel or rotating storage unit which is similar to that disclosed and claimed in a co-pending application Ser. No. 193,757 filed Oct. 3, 1980, and entitled "Carousel Automatic Storage and Retrieval System", which is a continuation of Ser. No. 910,453 filed on May 30, 1978, now abandoned. The present invention represents an improvement over the aforementioned co-pending application in the extraction/insertion mechanism disclosed therein.

BACKGROUND OF THE INVENTION

1. Field of the Invention

The present invention relates to a retrieval and storage mechanism used in conjunction with a carousel storage system for handling small parts and the like. More particularly, the present invention relates to an extraction and insertion platform which is an integral part of a rotating storage unit of the type which is computer controlled from a remote station.

2. Prior Art

In the above co-pending application, there is described a carousel automatic storage and retrieval system for inventory items such as those found in warehouses. These are numerous automatic storage and retrieval system used in warehouse applications. The prior storage and retrieval systems attempt, by various means, to reduce the time necessary to place inventory items in storage and the time required in retrieving those items from storage. Small parts cannot always be palletized and must often be stored in open bins or containers due to their size or delicate construction.

Conventional storage and retrieval systems utilize solid shelves whereby an extractor or picking mechanism must go to the shelf to pick the desired inventory item. The above co-pending application provides a system whereby the desired inventory items are brought to the extractor mechanism in baskets or bins as opposed to having solid shelves where the extractor mechanism must go to the shelf. Combining a single extractor mechanism with a plurality of independently operating systems which bring inventory items to the extractor can multiply the speed of operation.

However, the extractor mechanism of the above co-pending application employs vacuum pump suction rings mounted on the end of a traveling arm to insert containerized inventory items into storage or to extract containerized items from storage. The suction rings contact the sides of a container or tote bin in the carousel system, and are limited to a weight capacity of approximately 50 pounds. A tote bin in excess of fifty pounds would cause the suction cups to break loose from the traveling arm.

The side surfaces of the tote bins are required to have a special surface texture in order for the suction cups to operate properly. Additional problems due to contaminents on the surface of the tote bins, such as oil, can occur. The contaminents can cause a breakdown in either the integrity or the elasticity of the rubber suction cups.

In order to overcome these disadvantages of the prior art, the present invention is provided with a pair of driven arms which extend forward to catch the front lower lip of a tote bin or box and thereby extract the box onto a platform. The present invention has an increased weight capacity in excess of 350 pounds. The present invention is capable of operating properly regardless of the surface conditions of the tote bins.

SUMMARY OF THE INVENTION

In light of the above, the present invention provides an improved extractor and insertion mechanism or platform which is an integral part of a rotating storage system that is computer controlled from a remote station. The rotating storage unit is essentially identical to the storage carousels in the above co-pending application. The rotating storage unit is provided with a plurality of individual shelves which contain boxes or tote bins. The shelves are arranged vertically into columns which move along an oval track. The platform is driven vertically inside a permanently mounted elevator which is directly adjacent to the shelves. The platform is moved vertically to a selected position where it can extract or insert an item into a prescribed shelf in the rotational storage unit.

The extraction/insertion platform includes an extraction/insertion arm assembly which is slidably mounted on a portion of the platform. The arm assembly is moved by means of a motor driven traveler plate assembly which is affixed to a lower portion of the platform. The platform comprises a rectangular metal base and an attached mounting frame which fits inside the elevator. The interior of the platform includes a conveyor belt which passes over a pair of elongated belt mounting plates or brackets and a skatewheel assembly. The platform is also provided with a pair of pneumatic pop-up gates or retainer bars at the forward and rear ends of the platform along the sides of the conveyer belt. The gates hold a tote bin in place on the platform.

The arm assembly is provided with pneumatic cylinders located under each of the arms. A linkage in each arm raises the arm when its pneumatic cylinders is actuated. A traveler plate drive motor drives a sprocket which is located near the rear of the platform. A chain passes around this sprocket and around a similar sprocket located near the front end of the platform. A traveler plate drive assembly which comprises, in part, a cam follower is attached to the above chain. The cam follower is received in an elongated oval slot in a traveler plate. The traveler plate is an integral part of the arm assembly and is disposed below the conveyor belt and extends transversely with respect to the conveyor belt but parallel to the upper and lower flights thereof. The traveler plate is also provided with a pair of triangular flanges or plates mounted on its ends. The triangular flanges are received between two angle plates, which are affixed to the sides of the platform, to slide therebetween.

The arm assembly also comprises a pair of arms mounted on the traveler plate in longitudinal alignment with the conveyor belt. The elongated oval slot lies between the two arms in axial alignment with the traveler plate. The arms are each housed between two sides plates and are pivotally mounted thereto by means of a pivot pin which passes through suitable holes at the rear of the arms and side plates. The ends of the arms are provided with spring-loaded flippers or fingers which engage the bottom of a tote bin during the extraction operation.

The present invention is also provided with a solenoid-operated version of the arms and a solenoid-operated version of the pop-up gates.

DETAILED DESCRIPTION OF THE PREFERRED EMBODIMENTS

The present invention relates to an improved extraction/insertion mechanism for use with a rotating storage unit. The rotating storage unit provides a means of automatic storage and retrieval for small parts and the like.

Figure 1:
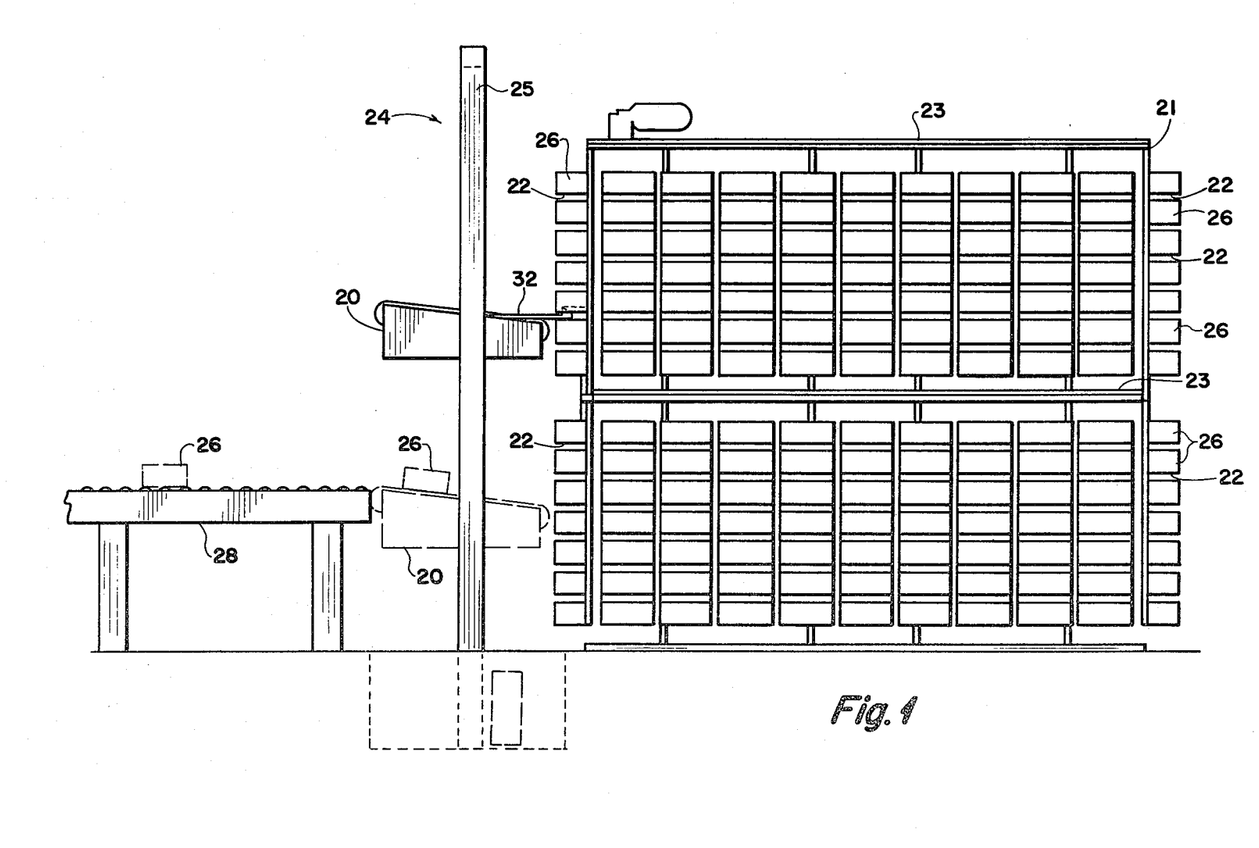
FIG. 1 is an elevational view of an extraction/insertion platform being mounted on a supporting elevator adjacent to a rotating storage unit in accordance with the present invention.

Referring to FIG. 1 an extraction/insertion platform 20 of the present invention is shown as an integral part of a storage system which also includes a rotating storage unit 21. Rotating storage unit 21 (including two vertical carousels) is essentially identical to the storage carousels in the above co-pending application. The rotating storage unit is provided with a plurality of individual shelves 22 which contain boxes or tote bins 26. Small parts, such as aircraft parts or computer parts, could be stored in the tote bins. The shelves 22 are arranged vertically into columns which move along an oval track 23. Each shelf 22 contains a tote bin 26 such that the plurality of tote bins 26 are arranged parallel to each other and are moved along the oval track 23 by means of a motor system (not shown) which is controlled from a remote digital keyboard operator's terminal (not shown).

As shown by the dotted lines, the platform 20 is moved vertically inside a permanently mounted supporting elevator 24, which is directly adjacent to a column of shelves 22. Two spaced vertical poles 25 (only one of which is shown) support the platform 20 and the platform is slidably attached thereto, such that platform 20 slopes downwardly toward the rotating storage unit 21. The platform is driven vertically, by means of an electric motor, a chain, and weights (none of which are shown), the latter being attached to the chain and being used as a counter balance; thus, the platform can be driven to a selected position where it can extract or insert an item (or bin) into a prescribed shelf in the rotating storage unit 21. The feeding or home position of the platform would be from a waist-high work station 28. The placement of the tote bins 26 is randomly done through the use of a remote laser scanner (not shown). The computer memory (not shown) in the operator's terminal remembers where each tote bin is stored in the system, and it will retrieve the desired coded bin upon command.

Figure 2:
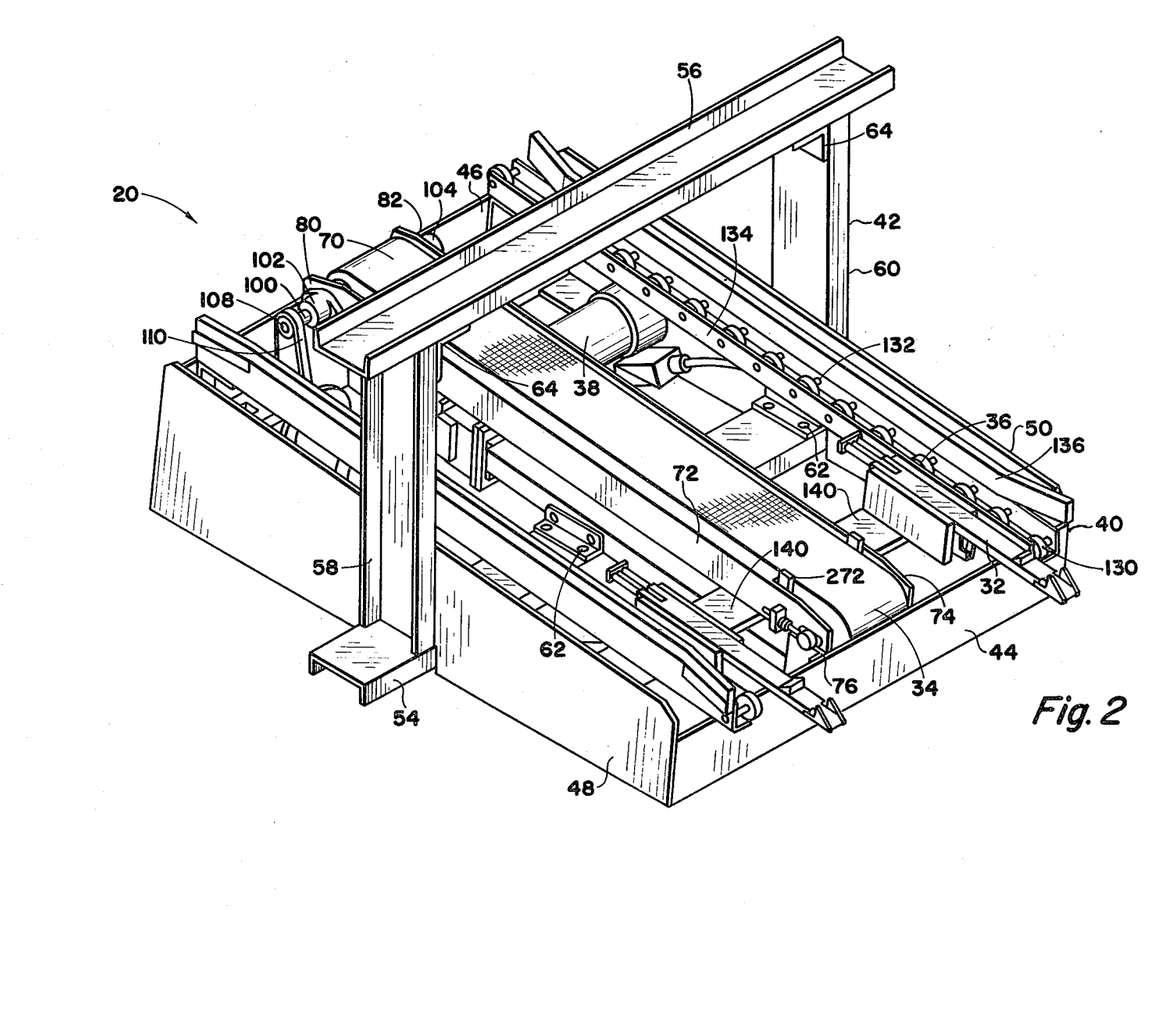
FIG. 2 is an isometric view of the platform of the present invention with the extraction/insertion end being shown to the right.
Figure 3:
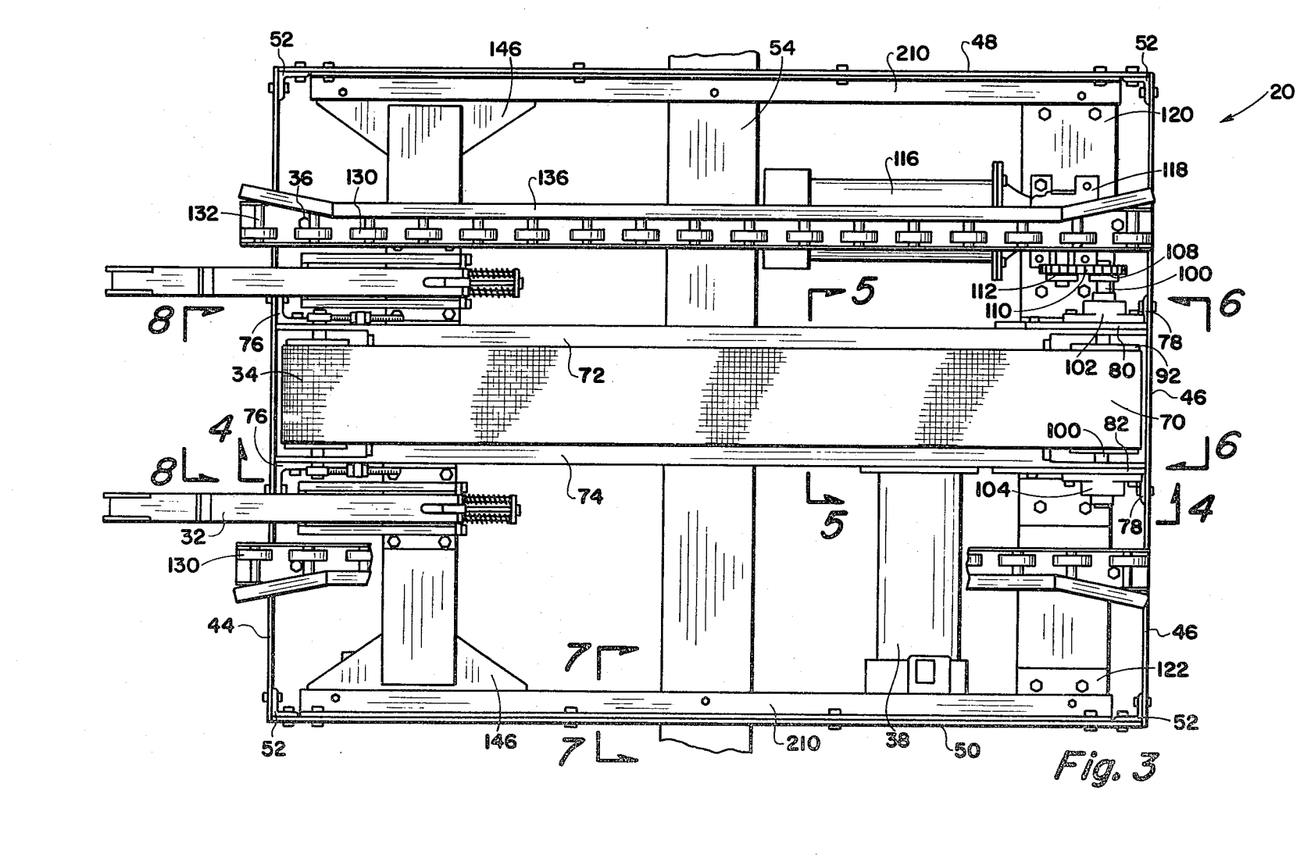
FIG. 3 is a top plan view of the platform, with the extraction/insertion end being shown to the left.

Referring to the drawings in detail, the extraction/insertion platform 20 of the present invention is shown in FIGS. 2 and 3. Platform 20 includes an extraction/insertion arm assembly 32, a conveyor belt assembly 34 and a skatewheel assembly 36, the greater details of which will be disclosed herein after. A traveler plate drive motor 38 is also shown, whose purpose will be disclosed hereinafter.

Figure 4:
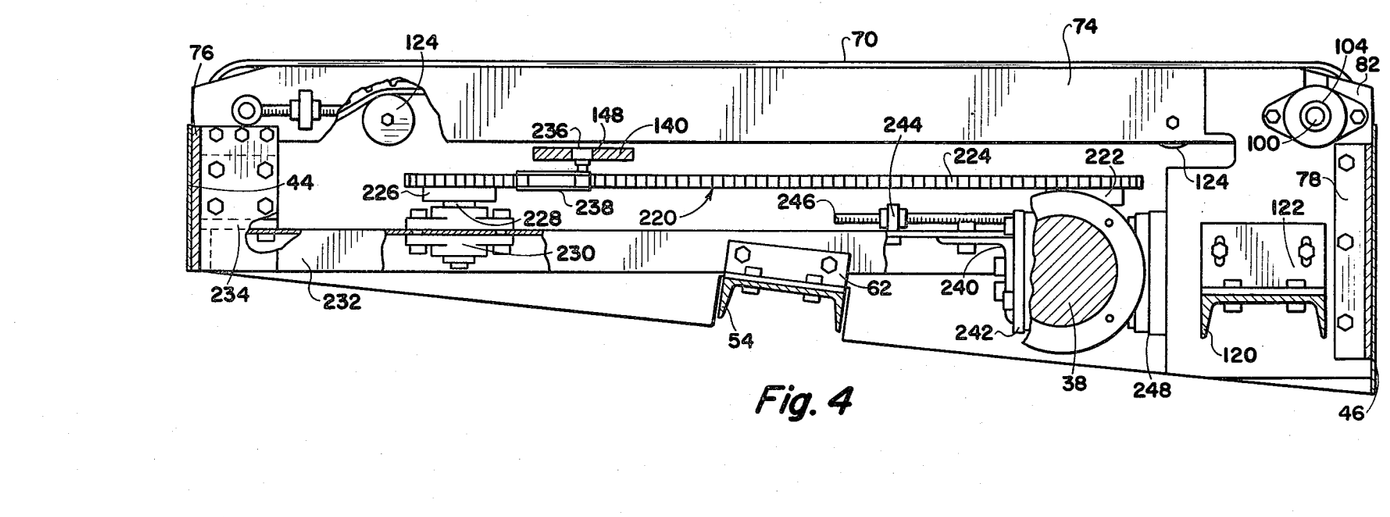
FIG. 4 is a cross sectional view taken along section line 4—4 of FIG. 3, showing a portion of the platform the lower edge of which is actually horizontal in its operating position.

Referring in detail to FIGS. 2, 3, and 4, the platform 20 is comprised of a substantially rectangular base 40 and a mounting frame 42 which is disposed perpendicular to the base 40. The base comprises a front cover plate 44, a rear cover plate 46 and a pair of trapezoidal shaped side cover plates 48 and 50. The cover plates are joined together by a plurality of corner braces 52 in essentially rectangular relationship (see FIG. 3). Hereinafter the word "front" or "forward" represents an article or position on platform 20 which is adjacent to the rotating storage unit 21, and the word "rear" represents an article or position on the platform which is adjacent to work station 28. The mounting frame 42 provides a means to insert the platform 20 into the supporting elevator 24. Mounting frame 42 fits between the two vertical posts 25 and is slidably mounted therebetween. The mounting frame includes a lower cross channel 54, an upper cross channel 56 and two side channels 58 and 60. The lower cross channel 54 passes through an appropriate slot in the side coverplates 48 and 50 along the bottom portion of platform 20 and is affixed to the interior of the side cover plates 48 & 50, respectively, by means of a pair of cross channel braces 62. The side channels 58 and 60 are vertically disposed and are perpendicular to the platform 20, and are affixed thereto by means of bolts. The upper cross channel 56 is disposed above the platform in parallel relation to the lower cross channel 54, and is mounted on the two side channels 58 and 60 by means of a pair of upper channel braces 64. The upper channel braces are attached to the side channels and the upper cross channel by bolts.

Figure 5:
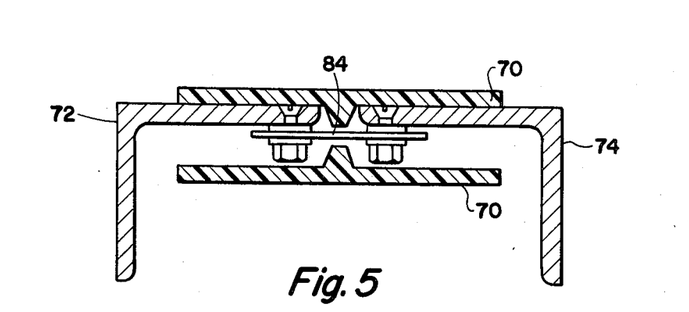
FIG. 5 is a cross sectional view taken along section line 5—5 of FIG. 3, showing a portion of a conveyor belt on the platform of the present invention.

Referring now to FIGS. 2, 3, 4, 5, and 9, the conveyor belt assembly 34 is longitudinally disposed in the center of platform 20, and is inclined downwardly toward the rotating storage unit 21. Conveyor belt assembly 34 comprises a conveyor belt 70, which slides over the top of a pair of slider bed angle plates 72 and 74. The slider bed angle plates 72 and 74 are mounted on a pair of front center braces 76 which are bolted to the front cover plate 44, and on a pair of rear center braces 78 which are bolted to the rear cover plate 46. The rear ends of slider bed angle plates are each provided with a drive support plate 80 and 82, respectively (see FIG. 10) which are affixed to the rear center braces 78. As best shown in FIG. 5, angle plates 72 and 74 are joined together by means of a bed plate 84 to form a channel. The bed plate 84 is bolted beneath the adjacent edges of the angle plates 72 and 74 as shown.

The belt 70 passes around a forward driven roller 90 and a rear drive roller 92. The forward driven roller is rotatably mounted on the forward ends of slider bed angle plates 72 and 74 by means of a shaft 94. The shaft 94 passes through suitable openings in the angle plates 72 and 74 and is held in place by a belt tension apparatus 96 (FIG. 9) which is received on each end of shaft 94.

The rear drive roller 92 is rotatably mounted on the rear ends of slider bed angle plates 72 and 74 by means of a shaft 100 which passes through suitable openings in the angle plates. The ends of shaft 100 are received in a pair of bearings 102 and 104 which are bolted to the angle plates 72 and 74, respectively, and to the drive support plates 80 and 82, respectively.

On the portion of the shaft 100 which extends outwardly beyond the bearing 102 is received a sprocket 108. A motor chain 110 passes around sprocket 108 and around another sprocket 112 which is rotatably mounted on a stub shaft (not shown). A belt drive motor 116 operates the belt 70 as follows: The belt drive motor 116 drives a gear reducer 118 which is affixed to a channel 120. The channel 120 is affixed to the platform 20 by means of a plurality of angle attachments 122. The output of the gear reducer drives the stub shaft on which the sprocket 112 is mounted. The belt assembly 34 is also provided with a pair of idler rollers 124 (FIG. 4) which are affixed to the slider bed angle plates 72 and 74.

The platform 20 is provided with a pair of longitudinally disposed skatewheel assemblies 36. The skatewheel assemblies 36 are disposed along the sides of the conveyor belt assembly 34. The skatewheel assembly comprises a plurality of modified skatewheels 130 which are rotatably mounted on a plurality of horizontally disposed rods 132. The rods 132 are received within a skatewheel angle attachment 134 which is affixed to a portion of the platform 20. Skatewheel assembly is also provided with a skatewheel guide 136 which is mounted on the outer portion of angle attachment 134.

Figures 13, 14:
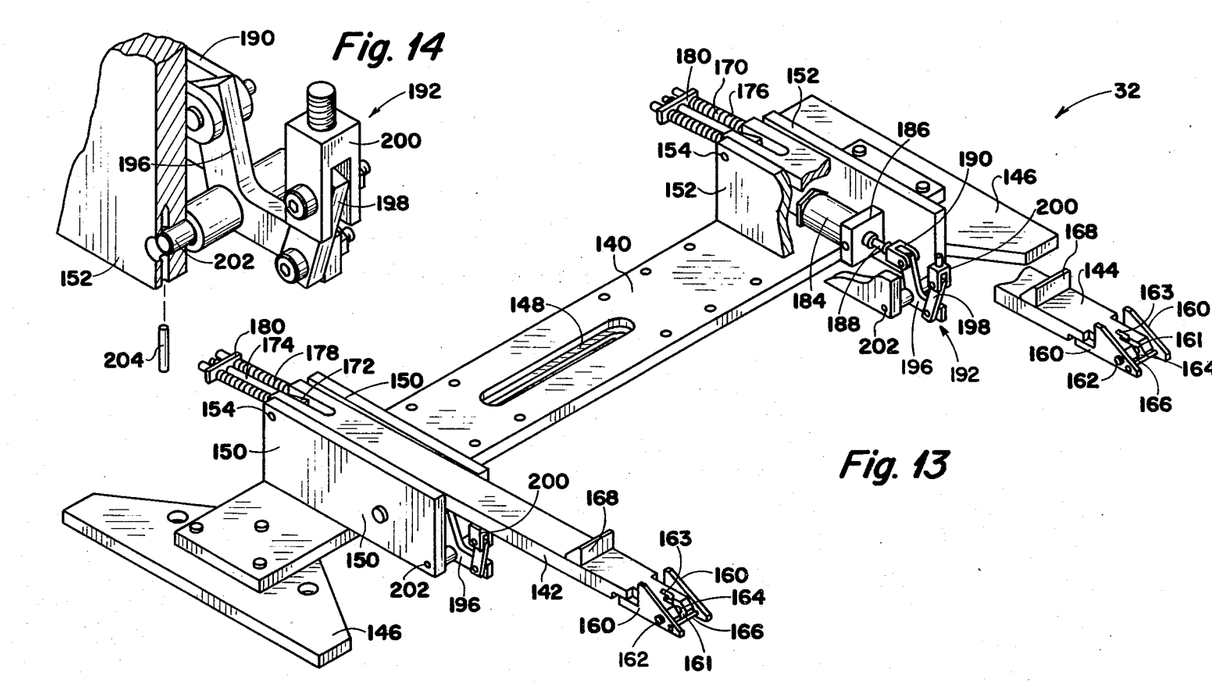
FIG. 13 is an isometric view showing the arm assembly of the present invention with certain parts being cut-away to show hidden detail.
FIG. 14 is an enlarged isometric view of an arm linkage in accordance with the present invention.
Figure 15:
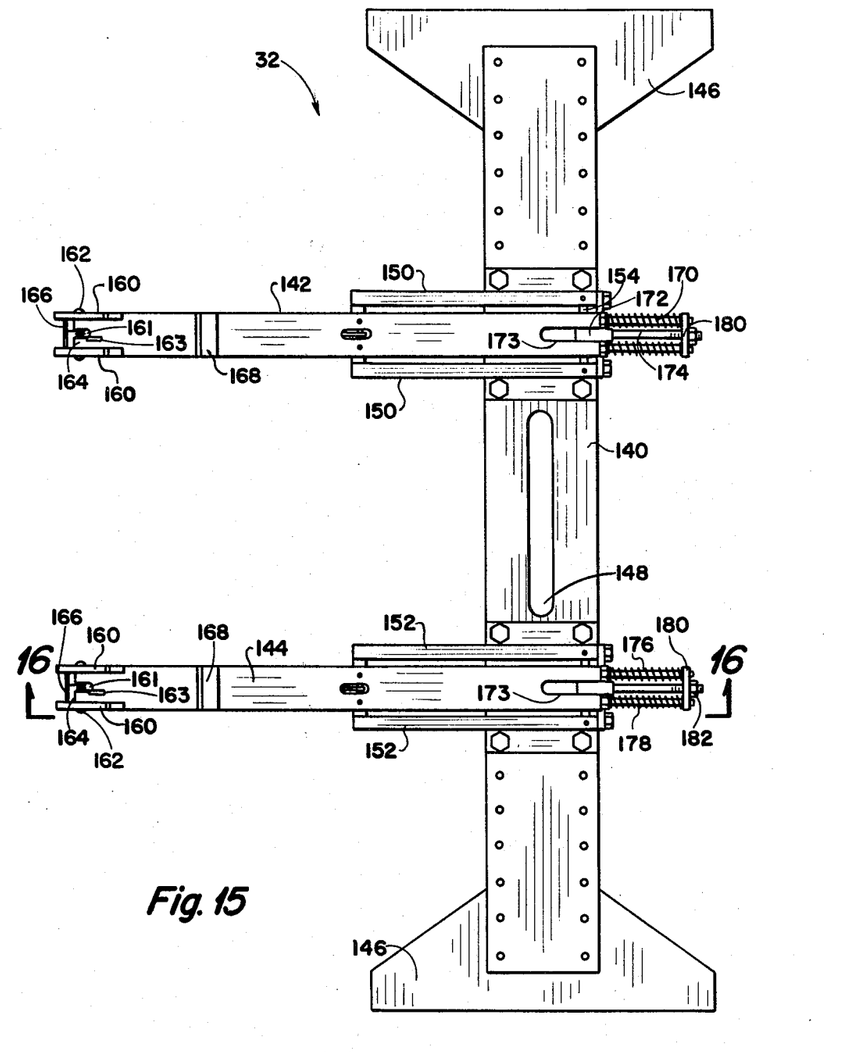
FIG. 15 is a top plan view of the arm assembly.

Referring to FIGS. 13, 14, and 15 in detail, the arm assembly 32 comprises an elongated traveler plate 140 which extends transversely across the platform 20 and a pair of extraction/insertion arms 142 and 144. The traveler plate 140 is provided with a pair of triangular flanges or plates 146 mounted on its ends. Traveler plate 140 is also provided with an elongated oval slot 148, the purpose of which will be disclosed hereinafter.

The arms 142 and 144 are mounted on the upper portion of the transverse traveler plate 140 and extend longitudinally with respect thereto. The arms 142 and 144 are each housed between a pair of side plates 150 and 152, respectively. The arms 142 and 144 are pivotally mounted on side plates 150 and 152, respectively, by means of a pivot pin 154 which is received in suitable holes at the rear of the arms.

The arms 142 and 144 each comprise a pair of flippers 160 which are pivotally connected to the forward ends of the arms by means of a flipper pin 162. The flippers 160 are provided each with a flipper return spring 164 (the details of which are not shown) and spring pin 166. The spring 164 is coiled or wound around the pin 162 in a central recess 161 in the flipper 160. One end of the coil spring 164 is received in a spring slot 163 in the arm 142 (or 144) and the other end of the spring is disposed over the spring pin 166 to return the flipper 160 to the position shown in FIG. 13 after the flipper has been depressed. The arms 142 and 144 are also provided with a pusher block 168 mounted on top of each arm, for a purpose which will hereinafter appear.

Each arm is provided with a set of overtravel springs 170 which extend from the rear of each arm. The overtravel springs 170 are mounted on the arms 142 and 144 adjacent the pivot point generated by pivot pin 154 by means of a spring guide 172. Each spring guide 172 is received within a recess 173 provided in the rear ends of arms 142 and 144 such that the pivot pin 154 also passes through spring guide 172. Each arm 142 (or 144) is provided with a slot 175 (see FIG. 16) in which pin 154 is received for a purpose which will hereinafter appear.

The spring guide 172 is provided with a connecting rod 174 which extends rearwardly therefrom. The overtravel springs 170 comprise a pair of compression springs 176 which are each received on a guide rod 178. The guide rod 178 and connecting rod 174 are associated together by means of a spring plate 180 which is slidably received over the ends of the guide rods 178 and connected to the rod 174. The spring plate is locked in place by means of a lock nut 182 which is received on connecting rod 174. Now, if an excessive pushing force were exerted on the arm 144 towards the right (for example by a right hand force against the pusher block 168) the arm 144 could move to the right (in relation to FIG. 16) by virtue of slot 175 in which the pin 154 is received; at the same time, the right hand ends of the guide rods 178 would move outwardly through their holes in the spring plate 180 while the springs 176 would be compressed. When the pushing force was released from the arm 144, the springs 176 would return the elements to the position shown in FIG. 16.

The arms 142 and 144 are raised by means of pneumatic cylinders 184 (see FIG. 13) which are located, in parallel arangement, below the arms 142 and 144 and between the side plates 150 and 152, respectively. Each of the pneumatic cylinders 184 is connected to a cylinder block 186 which is affixed to the side plates. Each pneumatic cylinder is provided with a piston rod 188 which extends slidably beyond the block 186 and which is connected to a cylinder clevis 190, the latter being connected to an arm linkage 192 which raises each of the arms 142 and 144 when the cylinder is actuated. Each arm linkage comprises a bell crank 196 which is connected to the cylinder clevis 190, and a connecting link 198, the latter in turn being connected to an arm clevis 200. Each bell crank 196 is pivotaly connected to the side plate 150 or 152 by means of a pivot pin 202. The pivot pin is held in place by means of a roll pin 204. Each clevis 200 is bolted into the underneath side of the arms 142 or 144.

Figure 7:
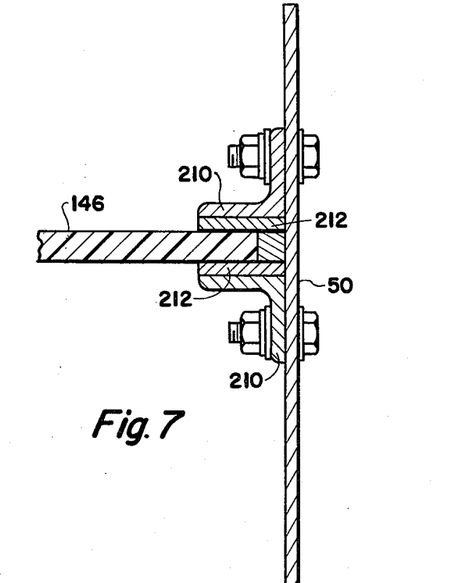
FIG. 7 is a cross sectional view taken along section line 7—7 of FIG. 3.

Returning to further consideration of FIGS. 2, 3 and 7, the arm assembly 34 is slidably mounted on a portion of the platform 20. As shown in FIG. 7, the triangular flanges 146 are slidably received between two side slider angles 210 which are affixed to the side covers 48 and 50 by means of bolts. The slider angles 210 are provided with a pair of strip slider plates 212 which are affixed to the angles 210 adjacent to the triangular flanges, and which provide a smooth surface for the flanges 146 to slide upon.

Figure 12:
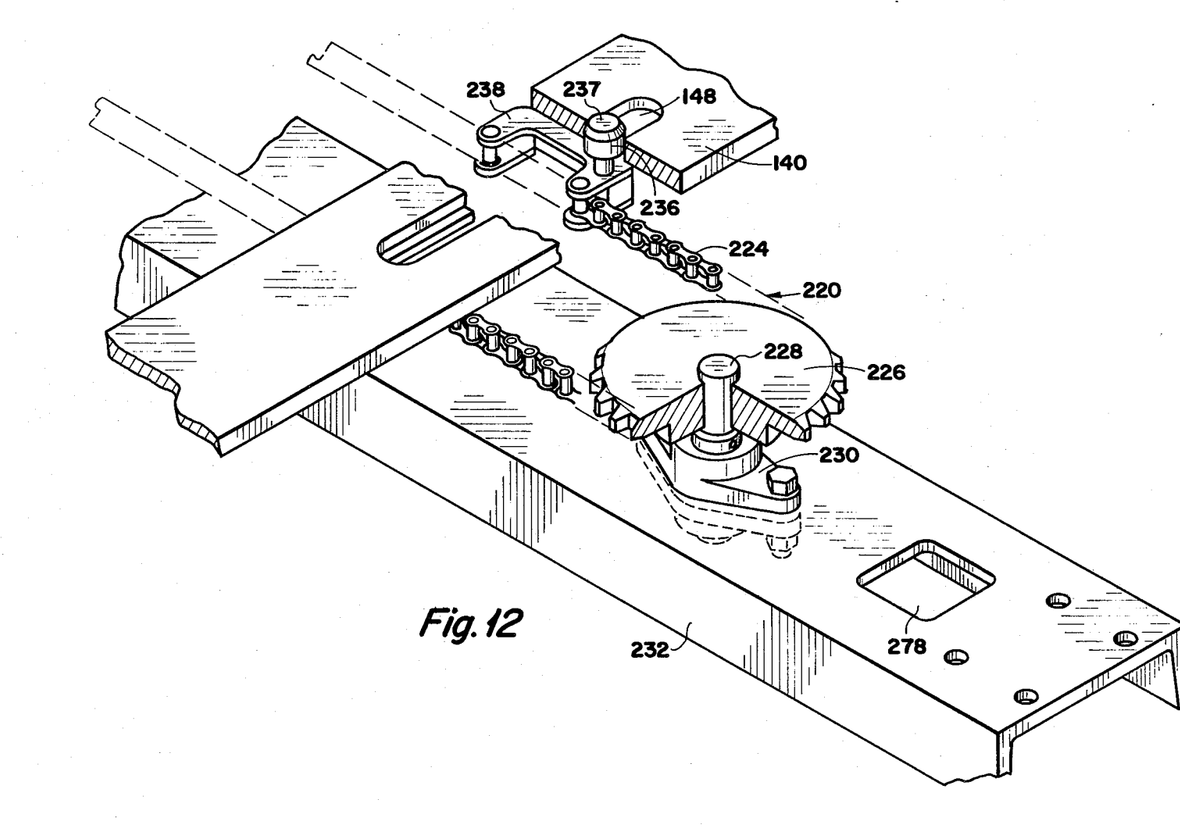
FIG. 12 is an enlarged isometric view showing the details the plate drive of the arm assembly in accordance with the present invention.

Referring to FIGS. 4, and 12, the arm assembly 32 is moved by means of a traveler plate drive assembly 220 which is driven by traveler plate drive motor 38. The arm assembly 32 is slidably mounted, in the manner described above, to a portion of the platform 20, such that the arms 142 and 144 are in longitudinal alignment with the platform between the skatewheel assemblies 36 and the conveyor belt assembly 34 (see FIG. 3).

The traveler plate assembly 220 comprises a sprocket 222 which is located near the rear (right in FIG. 4) of platform 20 and which is driven by motor 38 through suitable gearing and angle drive (not shown). A drive chain 224 passes around sprocket 222 and around a similar sprocket 226 which is located near the front of the platform. The sprocket 226 is rotatably mounted on a shaft 228 which is received within a bearing 230. The bearing 230 is bolted to a center channel 232 which is disposed beneath and parallel to the conveyor belt 70. The center channel 232 is affixed to the platform 20 by means of a pair of center channel braces 234 which are bolted to front center braces 76. The lower cross channel 54 is also lifted to center channel 232 by means of cross channel braces 62.

The traveler plate drive assembly 220 also comprises a cam follower 236 which is in the nature of a roller and which is received in the elongated oval slot 148 in the traveler plate 140. The cam follower 236 is attached to the drive chain 224 by means of a chain guide fixture 238 which is connected across the links of the chain as shown. More particularly, the cam follower is rotatably mounted on a pin 237 which is connected to and projects upwardly from the guide 238. The traveler plate drive motor is affixed to the center channel 232 by means of a tension angle 240. The motor 38 is provided with a chain reducer plate 242, which is bolted to one side of the tension angle 240, and tension block 244, which is received on a tensioning rod 246. The motor 38 is also provided with a plurality of reducers 248.

Figure 10:
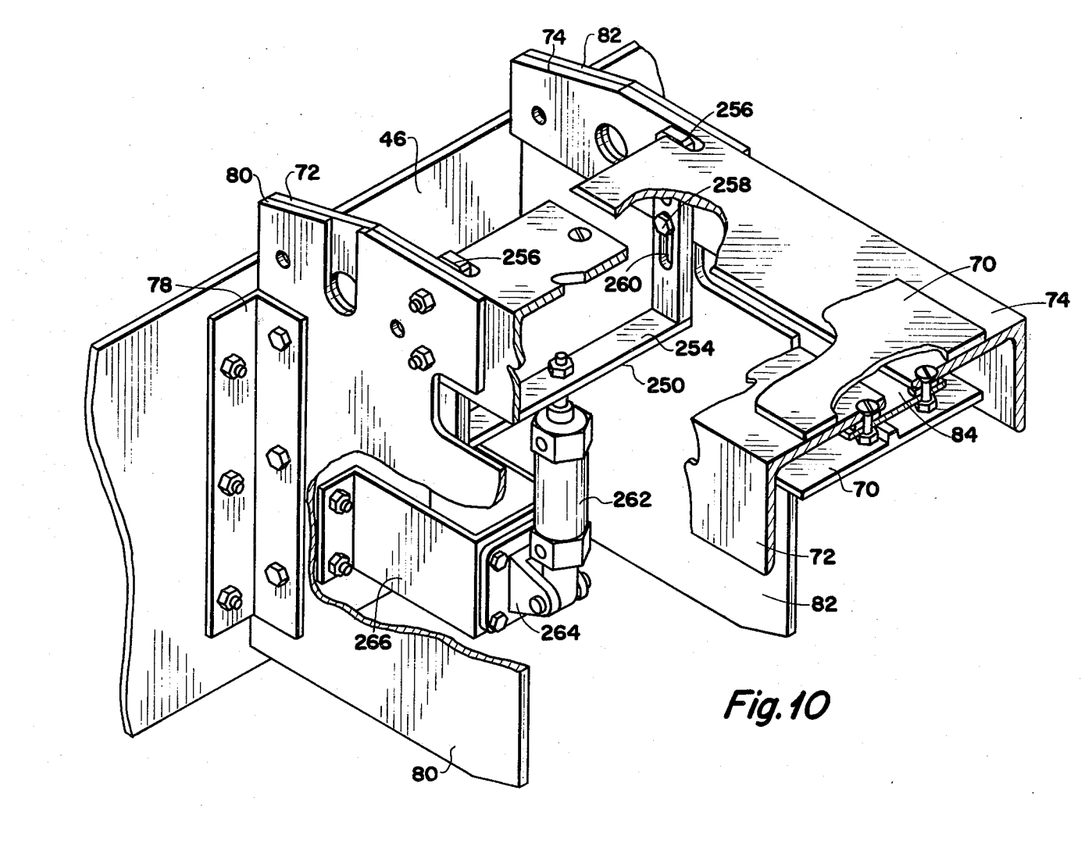
FIG. 10 is an enlarged isometric view of a pneumatically operated pop-up gate located at the rear end of the platform, with certain parts being cut-away to show hidden detail.
Figure 11:
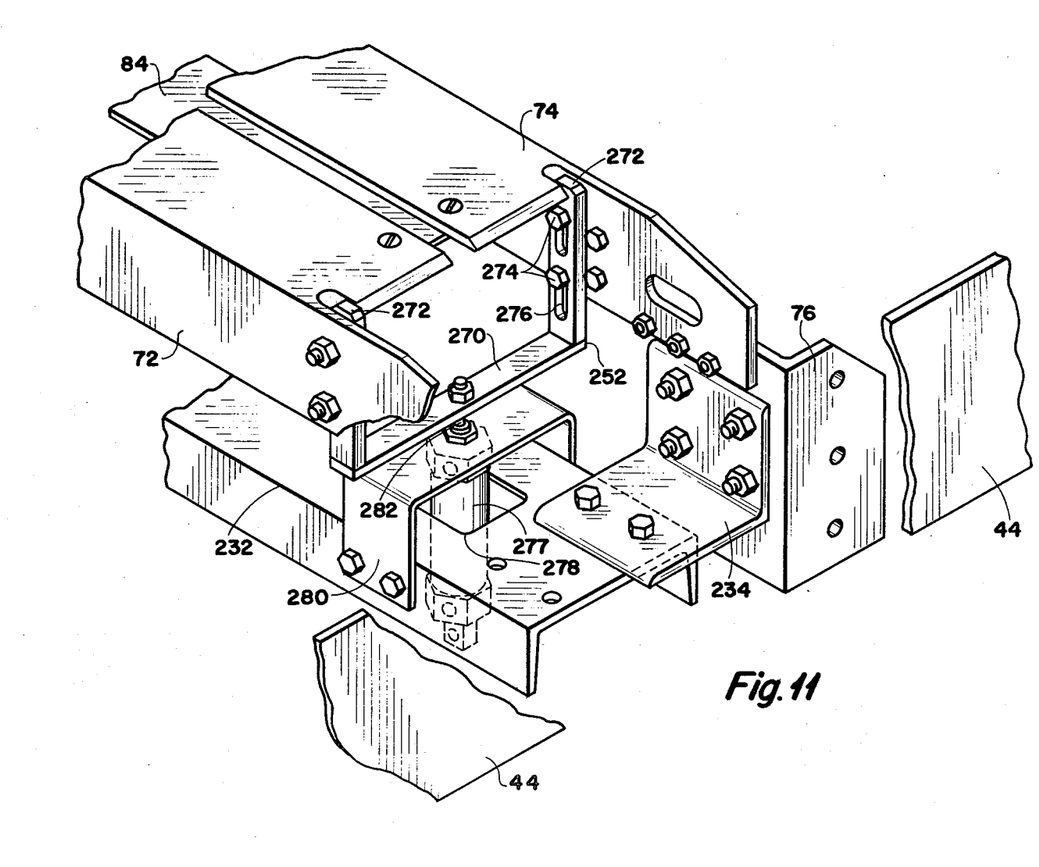
FIG. 11 is an enlarged isometric view of a pneumatically operated pop-up gate located at the front end of the platform, with certain parts being cut-away to show hidden detail.

Referring to FIGS. 10 and 11, the platform 20 is also provided a rear "pop-up" gate assembly 250 and a forward "pop-up" gate assembly 252, respectively. The pop-up gates act as safety stops to prevent a tote bin 26 from falling off the platform 20. The rear pop-up gate assembly 250 comprises a rear crossmember or bar 254 and two upwardly extending rear retainer bars 256 which are adapted to extend through slots at the rear of slider bed angle plates 72 and 74 (in a manner to be disclosed hereinafter). The rear retainer bars 256 are slidably mounted on the angle plates 72 and 74 by means of bolts 258 which are received in slots 260. A pneumatic cylinder 262 is attached at its upper end to the cross member 254 and at its lower end to a swivel bracket 264. The swivel bracket 264 is bolted to a U-shaped bracket or hat section 266 which is affixed to the rear cover plate 46.

The forward pop-up gate 252 comprises a forward crossmember or bar 270 and two upwardly extending forward retainer bars 272 which are adapted to extend through slots at the forward ends of the slider bed angle plates 72 and 74 (in a manner to be disclosed hereinafter). The forward retainer bars 272 are slidably mounted on the angle plates 72 and 74 by means of bolts 274 which are received in slots 276. A pneumatic cylinder 277 is received in a square hole 278 cut in the center channel 232, and is attached at its upper end to a cylinder mount 280 which is bolted to center channel 232. The cylinder 277 is connected to the forward cross member 270 by means of its piston rod 282 which projects upwardly through the mount 280 and is bolted at its upper end to the crossmember.

The following summarizes the insertion operation of the present invention:

A computer control (not shown) directs the platform 20 to be raised to a prescribed empty shelf 22 of the rotating storage unit 21 (which has been rotated by the control of the computor). It will be assumed that a tote bin 26 is mounted on the platform 20 as shown in the dotted lines in FIG. 1. The conveyor belt motor is activated thus causing movement of the conveyor belt. The tot bin 26 rolls along the skatewheels 130 over the lowered arms 142 and 144 downwardly toward the now stationary storage unit. The belt 70 stops momentarily as a sensor (not shown) alerts the computer that the forward end of the tote bin 26 is approaching the forward retainer bars 272. The retainer bars are lowered, by powering up the pneumatic cylinder 276 which causes a reverse pressure, which allows the tote bin 26 to pass over the forward end of the platform 20. The belt motor 116 is reactivated, and tote bin 26 is moved or slid partially onto the shelf 22.

The pneumatic cylinders 184 are now actuated, which activates the linkage assemblies 192 to raise the arm 142 and 144 simultaneously. The traveler plate drive motor 38 is activated when the tote bin passes aforementioned sensor, (not shown) which is located just to the rear of the forward retainer bars 272, thus causing the arm assembly to move forwardly toward the unit 21. The traveler plate drive motor 38 drives the sprocket 222 which subsequently drives the chain 224 around sprocket 228. The cam follower 236 rides in the slot 148 in the traveler plate 140; such that, as the chain guide fixture 238 moves in an elongated oval path (with respect to platform 20), cam follower 236 moves from side to side in the oval slot 148.

As the arms 142 and 144 move forward toward the rotating storage unit 21, the pusher blocks 168 on top of each arm, 142 and 144 engage the lower end of the tote bin and effect the final movement of the tote bin 26 into the shelf 22, in that, the arms 142 and 144 push the tote bin across the gap left by the belt 70. The forward movement is aided by the conveyor belt 70. As the arms 142 and 144, approach full extension, the weight of the tote bin beings the transfer to the shelf 22. At full extension, the tote bin 26 is seated on the shelf by the arms 142 and 144. The overtravel springs 170 at the ends of the arms allow the cam follower to move laterally in the slot 148 in the traveler plate, while the chain guide travels around sprocket 226. As the cam follower reaches the center of slot 148, the forward movement of the traveler plate 140 stops and the overtravel springs reach their maximum compression.

Another sensor, such as a photo-electric eye (not shown) or the like, mounted on the side at the front of the platform causes a signal to be sent to the computer controls when the tote bin 26 is seated on a shelf 22. The pneumatic cylinders 184 in the arm 142 and 144 are deactivated, thus causing them to drop away from the tote bin. The arm assembly 32 begins to move rearwardly as the cam follower crosses the center of the oval slot 148. The motors 38 and 116 are turned off when the arm assembly reaches its rearwardmost point, which is at a point where the flippers 160 at the ends of the arms 142 and 144 are disposed directly above the lower cross channel 54.

The following summarizes the extraction operation of the present invention:

The platform is positioned by means of computer controls at the proper shelf level for extraction of a tote bin 26. The pneumatic cylinders 184 are activated thereby raising the arms 142 and 144. The two drive motors 38 and 116 are activatedl; first motor 38 to cause the arm assembly 32 to move forward toward the rotating storage unit; and then the other motor 116 to move the conveyor belt toward the rear of the platform 20. The traveler belt drive motor 38 does not reverse due to the aforementioned drive chain 224 and traveler plate 140 interaction; however, the coveyor belt motor 116 is reversed from its direction during the above insertion operation.

The forward retainer bars 272 are again lowered, as the arms 142 and 144 travel toward the rotating storage unit. The arms contact the tote bin on the shelf as they approach their full travel point. The flippers 160, at the ends of arms 142 and 144, rotate about the pivot point 162 to be lowered as they contact the bottom of a tote bin 26. A notch or slave palette (not shown) is provided in the tote bin to receive the flippers 160 approximately one inch past the initial contact point. The flippers are spring loaded such that, the flippers 160 rotate (or return) to their original position to present a surface which faces pusher block 168, thus providing a means to hook or engage the bottom of the tote bin 26.

As the arms 142 and 144 reach their maximum forward travel position, the pusher blocks 168 contact the tote bin 26 as the overtravel springs 170 compress. The arm assembly 32 reverses direction as the cam follower 228 crosses the center of slot 148 in the traveler plate 140. The flippers engage the notch thus removing the tote bin from the shelf as the arms retract. The tote bin is drawn onto the platform until the aforementioned sensor near the forward retainer bars 272 senses that the tote bin is safely seated on platform 20. The pneumatic cylinders 184 are subsequently deactivated, thus dropping the arms 142 and 144 to a rest position. The belt motor 116 which drives the belt 70 causes the tote bin 26 to be brought fully onto the platform. The pneumatic cylinders 262 and 276 are activated to raise the rear crossmember 254 and the forward crossmember 270, respectively, thus causing the rear retainer bars 256 and the forward retainer bars 272 to extend over the slider bed angle plates 72 and 74. The motors 38 and 116 are switched off when the arm assembly reaches its aforementioned rearwardmost point.

Figure 6:
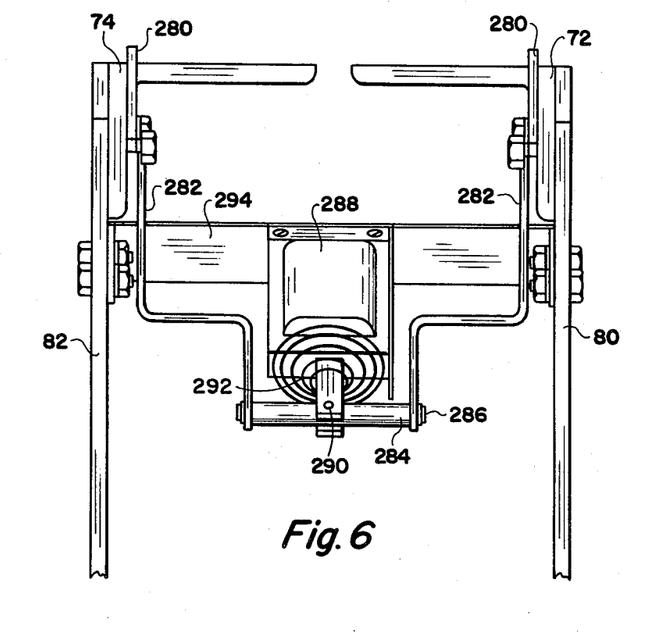
FIG. 6 is a cross sectional view taken along section line 6—6 of FIG. 3, showing a solenoid operated pop-up gate which is located at the rear of the platform in accordance with the present invention.
Figure 8:
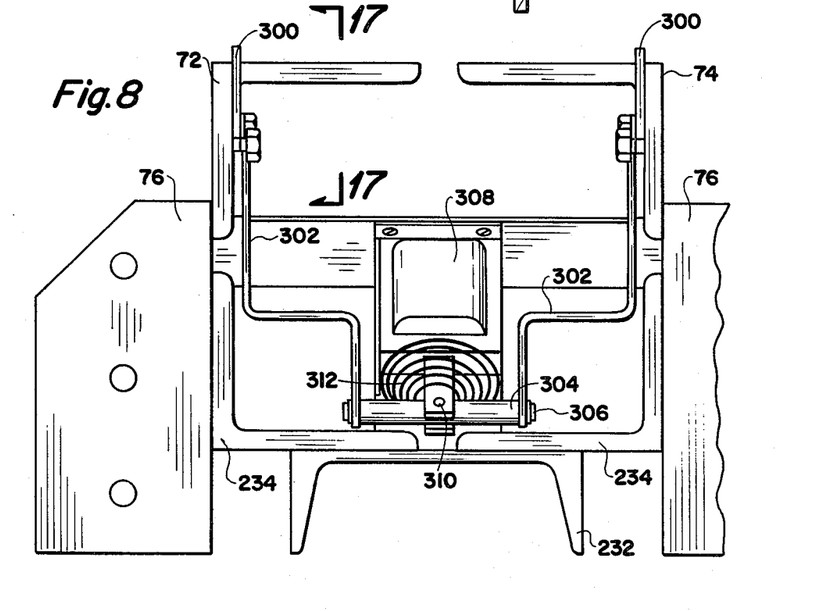
FIG. 8 is a cross sectional view taken along section line 8—8 of FIG. 3, showing a solenoid operated pop-up gate which is located at the forward end of the platform in accordance with the present invention.
Figure 9:
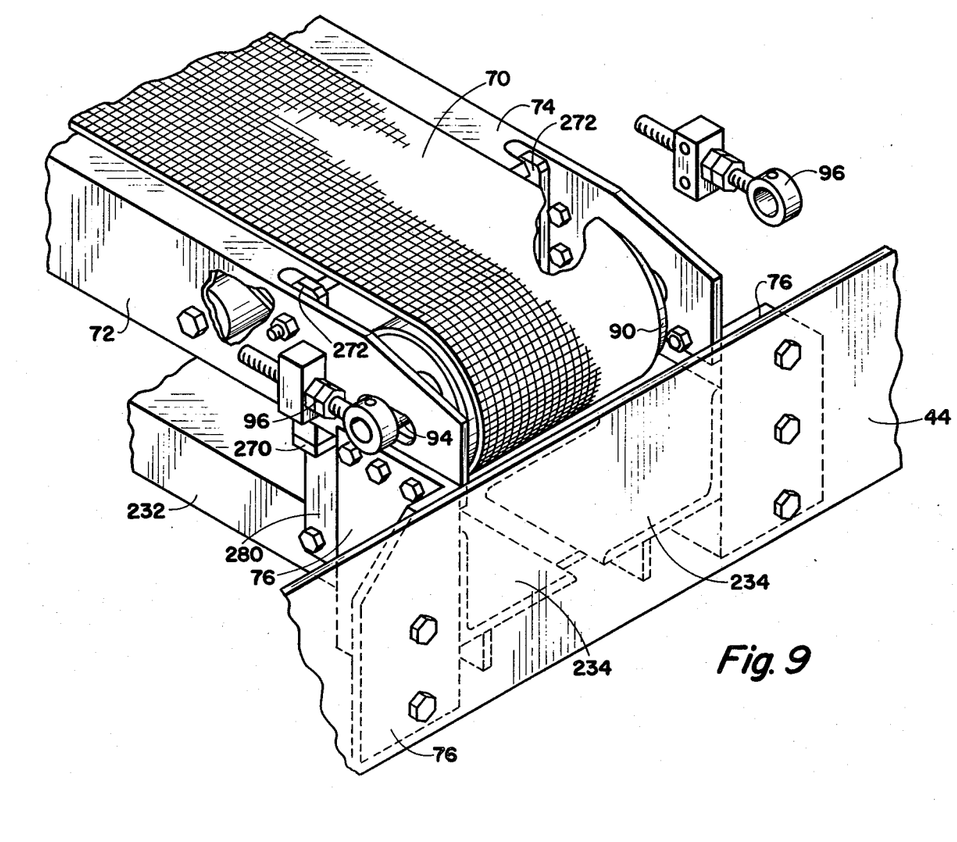
FIG. 9 is an enlarged isometric view of the forwardmost portion of the conveyor belt, with certain hidden parts being shown in dotted lines.
Figures 16, 17:
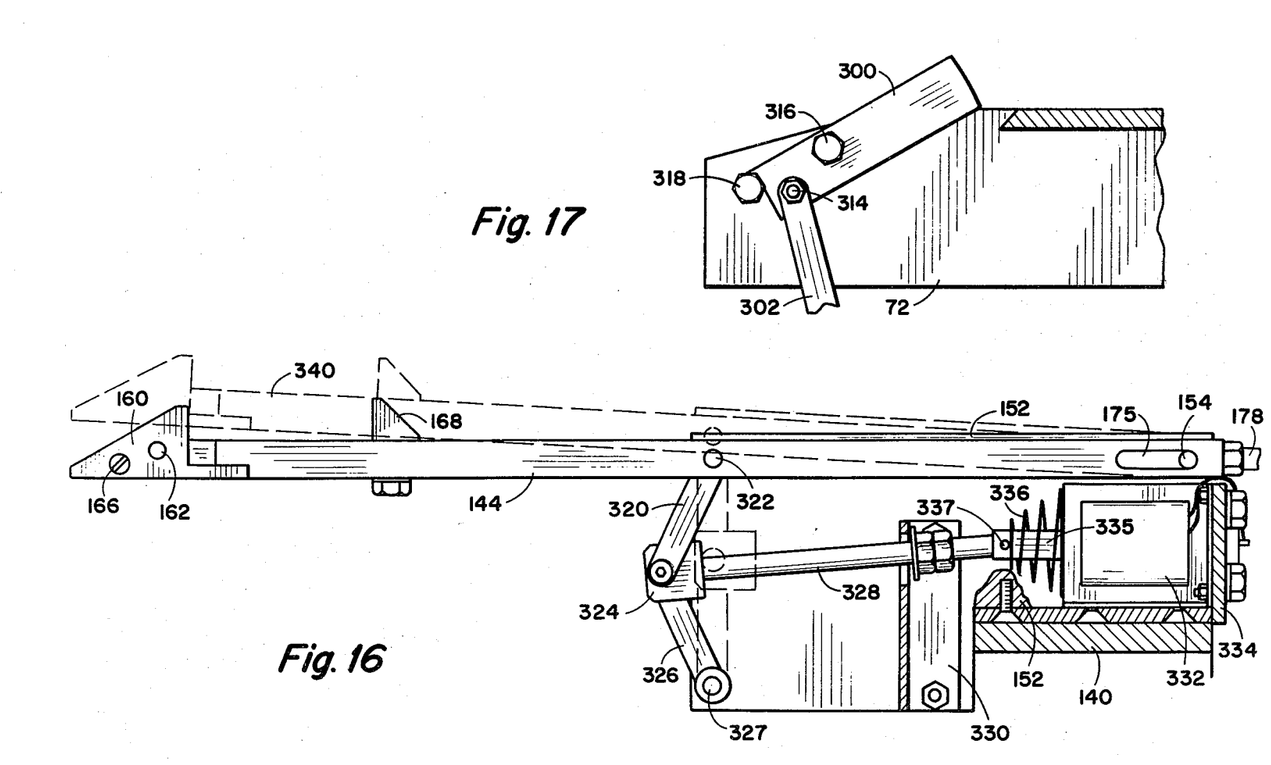
FIG. 16 is a cross sectional view taken along section 16—16 of FIG. 15 showing a solenoid operated extraction/insertion arm.
FIG. 17 is a cross sectional view taken along section line 17—17 of FIG. 8.

FIGs. 6, 8 and 17 show a solenoid-controlled variation of the rear pop-up gate and the forward pop-up gate, respectively, as alternate embodiments of the previously described hydraulic embodiments.

The forward solenoid-controlled safety stop shown in FIG. 8, is essentially identical to the rear safety stop shown in FIG. 6 which will be described hereinafter. The forward safety stop comprises a pair of pivotal flip-up stops 300 which extend above slider bed angle plates 72 and 74. These pivotal stops 300 can be contrasted with the stops 256 or 272 which move in a purely vertical position. The flip-up stops 300 are each connected to a pop-up linkage 302. The lower ends of the two pop-up linkages are joined by means of a flip-up bushing 304. The flip-up bushing 304 is provided with a pin actuator 306 which extends through the bushing and through the ends of the linkages 302 as shown. The flip-up bushing 304 is disposed above the center channel braces 234 and is connected to the lower end of a solenoid 308 by means of a clevis or roll pin 310. The solenoid 308 is provided with a return spring 312. When the solenoid 308 is activated, the flip-up stops 300 are lowered.

FIG. 17 shows additional details of the relation between the flip-up stop 300 and the flip-up linkage 302. The linkage 302 is pivotally connected to the flip-up stop 300 at a pivot point 314. The flip-up stop 300 is pivotally connected to the slider bed angle plate 72 at a point 316, and is also provided with a rest 318. When the solenoid 308 is activated, the flip-up linkage 302 is extended upwardly thereby causing the flip-up linkage 302 to pivot downwardly about its pivot point 316. The above action causes the flip-up stop 300 to be lowered away from the top of the slider bed angle plates 72 and 74. The above relation between the flip-up linkages and the flip-up stops is consistent for both of the solenoid controlled safety stops.

The rear safety stop, shown in FIG. 6, comprises a pair of pivotal flip-up stops 280 which are identical to stops 300 previously described, and which extend above the slider bed angle plates 72 and 74. The flip-up stops 280 are each provided with a flip-up linkage 282 which are connected at their lower ends by means of a flip-up bushing 284. The flip-up bushing 284 is provided with a pin actuator 286. A solenoid 288 is attached at its lower end to the flip-up bushing by means of a roll pin 290. A return spring 292 is received on the lower end of the solenoid 288 between the solenoid and the bushing 284. The upper end of solenoid 288 is mounted on a bracket 294 which is bolted to the inside of the drive support plates 80 and 82. When the solenoid 288 is activated, the flip-up stops 280 are lowered to permit a tote bin to pass over stops 280 onto work station 28 in the same manner as described in relation to the stops 300 referred to in the prior description of FIG. 8.

FIG. 16 shows a solenoid-operated variation of the previously described pneumatic embodiment (pneumatic cylinder 184 and associated linkage) for raising the arm 144 (or 142) of the present invention. In this version, the arm 144 is provided with an arm linkage 320 which is pivotally connected thereto by means of pivot pin 322. The other end of the arm linkage 320 is pivotally connected to a drive linkage 324 which is subsequently pivotally connected to a beam linkage 326, the lower end of which is connected to the frame of the platform 20 by means of pivot pin 327. The drive linkage is mounted on one end of a connecting rod 328 whose other end is mounted on an arm channel 330. A solenoid 332 is housed within the side plates 152 and is bolted to a rear cover 334. The solenoid 332 is provided with a movable armature 335, the outer end of which is pivotally connected to the end of the rod 328 by means of a pin 337 which projects outwardly from the sides of the armature 335. A return spring 336 is received on the armature 335 between the pin 337 and the housing of the solenoid to urge the rod 328 toward the left (FIG. 16) when the solenoid is deactivated. When the solenoid 332 is activated, the drive linkage 324 moves toward the rear cover 334 thereby causing the arm 144 to move into the raised position 340. When the solenoid is deactivated, the spring 336 will return the elements to the solid line position shown in FIG. 16. An identical solenoid 332 and associated linkage is, of course, provided for the other arm 142.

Whereas the present invention has been described in particular relation to the drawings attached thereto, it should be understood that other and further modifications, apart from those shown or suggested herein, may be made within the spirit and scope of this invention.

What is claimed is:

1. In combination with automatic storage and retrieval system having a continuous track and a continuous rotating storage unit supported from said track and movable therearound in a horizontal direction, wherein said rotating storage unit includes a plurality of horizontally spaced shelves arranged vertically into columns, each shelf being adapted to accommodate a storage bin thereon, a coveyor system mounted adjacent said rotating storage unit for moving storage bins towards and away from said rotating storage unit, and an elevator mounted in a fixed position between said rotating storage unit and said conveyor system; the improvement which comprises a platform mounted in said elevator for vertical movement up and down adjacent said rotating storage unit, an extraction and insertion arm assembly slidably mounted on said platform, said arm assembly including a pair of longitudinally disposed extractor arms having forward ends extending towards said rotating storage unit, a driving means for moving said arm assembly in a horizontal direction towards and away from said rotating storage unit for bin placement in and withdrawal from a preselected shelf, a spring loaded bin engaging means mounted on the forward end of each arm for removing a bin from a preselected shelf during an extraction operation, a seating means mounted on the upper portion of each said arm for pushing a bin onto a preselected shelf during an insertion operation, a conveyor belt assembly mounted on said platform in longitudinal alignment therewith between the extractor arms for aiding the movement of a bin into or withdrawal from a preselected shelf, and a retaining means for securing a bin on said platform.

2. A platform as set forth in claim 1 and being further characterized by said arm assembly including a traveler plate disposed beneath said conveyor belt assembly and transverse thereto, said traveler plate being slidably mounted along the side portions of said platform, said extractor arms being pivotally mounted on said traveler plate and being in spaced parallel relation to each other, said traveler plate including an elongated oval slot between said extractor arms, wherein said driving means for moving said arm assembly towards said rotating storage unit comprises a rear drive sprocket mounted on a motor shaft, a sprocket motor for rotating said motor shaft, a forward driven sprocket mounted on a forward shaft so as to be in axial alignment with said rear drive sprocket, said forward shaft being received in a bearing mounted on a lower portion of said platform, a motor chain passing around said rear drive sprocket and said forward driven sprocket, a roller being rotatably mounted on a chain guide which is affixed to a portion of said motor chain, said roller being received within said elongated oval slot in said traveler plate whereby said roller can move laterally in said oval slot as said chain guide travels with said motor chain around said sprockets and whereby said roller moves said traveler plate thereby causing said arm assembly to move in a horizontal direction towards and away from said rotating storage unit.

3. A platform as set forth in claim 1 wherein said spring loaded bin engaging means comprises a pair of flippers pivotally connected to the forward end of each said arm, a coiled return spring attached to each of said flippers by means of pins whereby said flippers are forced downwardly at initial contact with the bottom of a bin during the extraction operation and whereby said flippers are returned to their engaged position by virtue of said return springs to grip the lower edge of said bin.

4. A platform as set forth in claim 3 wherein said seating means comprises a pusher block mounted on top of each said extractor arm and being located rearwardly from said flippers, whereby said pusher blocks contact the front of a bin to seat said bin in a preselected shelf.

5. A platform as set forth in claim 1 and being further characterized by said arms being provided each with a linkage means to raise said arms into an engagement position for bin placement in and withdrawal from a preselected shelf.

6. A platform as set forth in claim 5 wherein each linkage means comprises an arm linkage connected at one end to a lower portion of each said arm and being pivotally connected at its other end to a pneumatic cylinder whereby actuating said pneumatic cylinder raises said arm into said engagement position.

7. A platform as set forth in claim 5 wherein each linkage means comprises an arm linkage pivotally connected at one of its ends to a lower portion of each said arm and being pivotally connected at its other end to a connecting rod, said connecting rod being pivotally connected to a solenoid, said solenoid being provided with a return spring whereby activating said solenoid raises said arm into said engagement position.

8. A platform as set forth in claim 1 and being further characterized by said conveyor belt assembly comprising a central conveyor belt disposed in longitudinal alignment with said platform, a forward driven roller rotatably mounted on a forward portion of said platform, a rear drive roller rotatably mounted on a rear portion of said platform, said conveyor belt passing around said rollers, a first sprocket drivingly connected with said drive roller, a second sprocket mounted for rotation in said platform, a chain drivingly connecting said first and second sprockets, and a belt drive motor for rotating said second sprocket to cause said belt to move about said rollers.

9. A platform as set forth in claim 8 wherein said retaining means comprises a pair of forward safety stops and a pair of rear safety stops, said forward safety stops being mounted on a forward portion of said platform so as to extend above the upper surface of the conveyor belt and said rear safety stops mounted on a rear portion of said platform so as to extend above the upper surface of the conveyor belt, thereby preventing a bin from falling off of said platform, and means for raising and lowering said stops.

10. A platform as set forth in claim 9 wherein said means for raising and lowering said stops includes a pneumatic cylinder for each pair of stops.

11. A platform as set forth in claim 9 wherein said means for raising and lowering said stops includes a solenoid for each pair of stops.

* * * * *